United States Patent
Finlay et al.

(10) Patent No.: US 11,142,322 B1
(45) Date of Patent: Oct. 12, 2021

(54) ATTACHMENT ASSEMBLY FOR A DRESS COVER AND A CUSHION OF AN AIRCRAFT SEAT

(71) Applicant: B/E Aerospace, Inc., Winston-Salem, NC (US)

(72) Inventors: Travis Finlay, Winston-Salem, NC (US); Joshua Miller, Ann Arbor, MI (US); Stephen A. Puglisi, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/008,296

(22) Filed: Aug. 31, 2020

(51) Int. Cl.
*B64D 11/06* (2006.01)

(52) U.S. Cl.
CPC ................... *B64D 11/0647* (2014.12)

(58) Field of Classification Search
CPC ... A47C 31/023; A47C 7/386; B64D 11/0647; B64D 11/00151; B60N 2/5825; B60R 11/0235; B60R 2011/0017
USPC .................................................... 297/452.59
See application file for complete search history.

(56) References Cited

U.S. PATENT DOCUMENTS

| | | | |
|---|---|---|---|
| 1,415,837 A * | 5/1922 | Green | A47C 21/022 5/405 |
| 1,650,294 A * | 11/1927 | Palmer | A47C 31/02 267/182 |
| 1,756,579 A * | 4/1930 | Wisner | B60N 2/7041 5/404 |
| 3,633,968 A | 1/1972 | Sears, Jr. | |
| 3,656,807 A * | 4/1972 | Arida | B60N 2/72 297/452.53 |
| 4,364,607 A | 12/1982 | Tamburini | |
| 4,379,352 A * | 4/1983 | Hauslein | B60N 2/5883 297/452.6 |
| 4,872,724 A * | 10/1989 | Deley | A47C 31/023 297/218.4 |
| 6,241,188 B1 * | 6/2001 | Simpson | B60N 2/6027 244/122 R |
| 6,345,866 B1 * | 2/2002 | Jackson | A47C 31/11 297/224 |

(Continued)

FOREIGN PATENT DOCUMENTS

| | | |
|---|---|---|
| DE | 102006019740 A1 | 11/2007 |
| EP | 1099627 A1 | 5/2001 |

(Continued)

*Primary Examiner* — Mark R Wendell
(74) *Attorney, Agent, or Firm* — Suiter Swantz pc llo

(57) ABSTRACT

An aircraft seat may include a support system with a diaphragm, a cushion with at least one surface configured to conform to a corresponding surface of the support system, a dress cover configured to fit over at least a portion of the cushion, and an attachment assembly. The attachment assembly may include a primary attachment feature coupled to the dress cover proximate to at least one edge of the dress cover or coupled to the cushion. The attachment assembly may include an auxiliary attachment feature integrated within the support system. The attachment assembly may be configured to secure the at least one surface of the cushion against the corresponding surface of the support system when the primary attachment feature is coupled to the auxiliary attachment feature at a single attachment interface for the support system, the cushion, and the dress cover.

9 Claims, 15 Drawing Sheets

(56) References Cited

U.S. PATENT DOCUMENTS

| | | | | |
|---|---|---|---|---|
| 6,612,648 | B1* | 9/2003 | Hashiguchi | B60N 2/5825 |
| | | | | 297/218.1 |
| 8,240,759 | B2* | 8/2012 | Hobl | B60N 2/5825 |
| | | | | 297/218.1 |
| 8,770,662 | B2 | 7/2014 | Mount et al. | |
| 9,352,677 | B2 | 5/2016 | Schittko | |
| 9,511,864 | B2 | 12/2016 | Simpson | |
| 9,809,138 | B2* | 11/2017 | Fuwa | B60N 2/7094 |
| 2010/0259079 | A1* | 10/2010 | Matsuzaki | B60N 2/5816 |
| | | | | 297/218.2 |
| 2015/0284093 | A1* | 10/2015 | Velasco | B64D 11/0647 |
| | | | | 297/452.1 |

FOREIGN PATENT DOCUMENTS

| | | |
|---|---|---|
| EP | 1000856 B1 | 1/2004 |
| FR | 2898859 B1 | 6/2008 |
| HK | 1027785 A | 4/1985 |
| HK | 1036607 A | 1/2002 |
| JP | 1989171507 A | 2/1991 |
| KR | 101758092 B1 | 7/2017 |

\* cited by examiner

ATTACHMENT ASSEMBLY FOR A DRESS COVER AND A CUSHION OF AN AIRCRAFT SEAT

BACKGROUND

Seats may include components such as a support system, a cushion, and a dress cover. The components may be coupled together with one or more attachment assemblies. In addition, in select industries the build of the seat (and any included components within the build) may be required to meet guidelines and/or standards.

SUMMARY

An aircraft seat is disclosed, in accordance with one or more embodiments of the disclosure. The aircraft seat may include a support system with a diaphragm. The aircraft seat may include a cushion with at least one surface configured to conform to a corresponding surface of the support system. The aircraft seat may include a dress cover. The dress cover may be configured to fit over at least a portion of the cushion. The aircraft seat may include an attachment assembly. The attachment assembly may include a primary attachment feature coupled to the dress cover proximate to at least one edge of the dress cover. The attachment assembly may include an auxiliary attachment feature integrated within the support system. The attachment assembly may be configured to secure the at least one surface of the cushion against the corresponding surface of the support system when the primary attachment feature is coupled to the auxiliary attachment feature at a single attachment interface for the support system, the cushion, and the dress cover.

In some embodiments, the primary attachment feature may include at least one set of a plurality of hooks. The auxiliary attachment feature may include at least one set of a plurality of holes. Each hole of the plurality of holes may be configured to receive a hook of the plurality of hooks.

In some embodiments, the at least one set of the plurality of hooks may be coupled to a side portion of the dress cover proximate to a side edge of the dress cover. The at least one set of the plurality of holes may be integrated within the support system proximate to a side edge of the support system.

In some embodiments, one or more hooks of the at least one set of the plurality of hooks may be coupled to a strap. The one or more hooks may be coupled to the dress cover via the strap. The strap may be coupled to the dress cover proximate to the side edge of the dress cover.

In some embodiments, the primary attachment feature may include a wire spring. The auxiliary attachment feature may include a plurality of tabs. Each tab of the plurality of tabs may include a groove configured to receive the wire spring.

In some embodiments, the wire spring may be coupled to the dress cover proximate to at least two edges of the dress cover. The plurality of tabs may be integrated with the support system proximate to at least two edges of the support system.

In some embodiments, the dress cover may include a sleeve coupled to the dress cover proximate to the at least two edges of the dress cover. The wire spring may be inserted into the sleeve.

In some embodiments, the wire spring may include at least one curved end. The at least one curved end may be configured to prevent the wire spring from disengaging from a tab of the plurality of tabs.

In some embodiments, at least one tab of the plurality of tabs may face inward toward a center of the support system. The at least one tab of the plurality of tabs may face outward away from the center of the support system.

In some embodiments, the primary attachment feature may include a plurality of hooks. The auxiliary attachment feature may include a plurality of wire supports of the diaphragm. At least some wire supports of the plurality of wire supports may include an inside curve configured to receive a hook of the plurality of hooks.

In some embodiments, the dress cover may include one or more extensions coupled to the dress cover. Each extension of the one or more extensions may be proximate to a side edge of the dress cover. The plurality of hooks may be coupled to the one or more extensions.

An aircraft seat is disclosed, in accordance with one or more embodiments of the disclosure. The aircraft seat may include a support system with a diaphragm. The aircraft seat may include a cushion with at least one surface configured to conform to a corresponding surface of the support system. The aircraft seat may include a dress cover. The dress cover may be configured to fit over at least a portion of the cushion. The aircraft seat may include an attachment assembly. The attachment assembly may include a primary attachment feature coupled to the cushion. The attachment assembly may include an auxiliary attachment feature integrated within the support system. The attachment assembly may be configured to secure the at least one surface of the cushion against the corresponding surface of the support system when the primary attachment feature is coupled to the auxiliary attachment feature at a single attachment interface for the support system, the cushion, and the dress cover.

In some embodiments, the primary attachment feature may include a plurality of hooks coupled to a plate. The plurality of hooks may be coupled to the cushion via the plate. The auxiliary attachment feature may include a plurality of wire supports of the diaphragm. At least some wire supports of the plurality of wire supports may include an inside curve configured to receive a hook of the plurality of hooks.

In some embodiments, the dress cover may include one or more extensions coupled to the dress cover. Each extension of the one or more extensions may be proximate to a side edge of the dress cover. The one or more extensions may include a plurality of holes corresponding to the plurality of hooks.

In some embodiments, the plurality of holes may be coupled to the plurality of hooks prior to the plurality of hooks engaging the plurality of wire supports.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
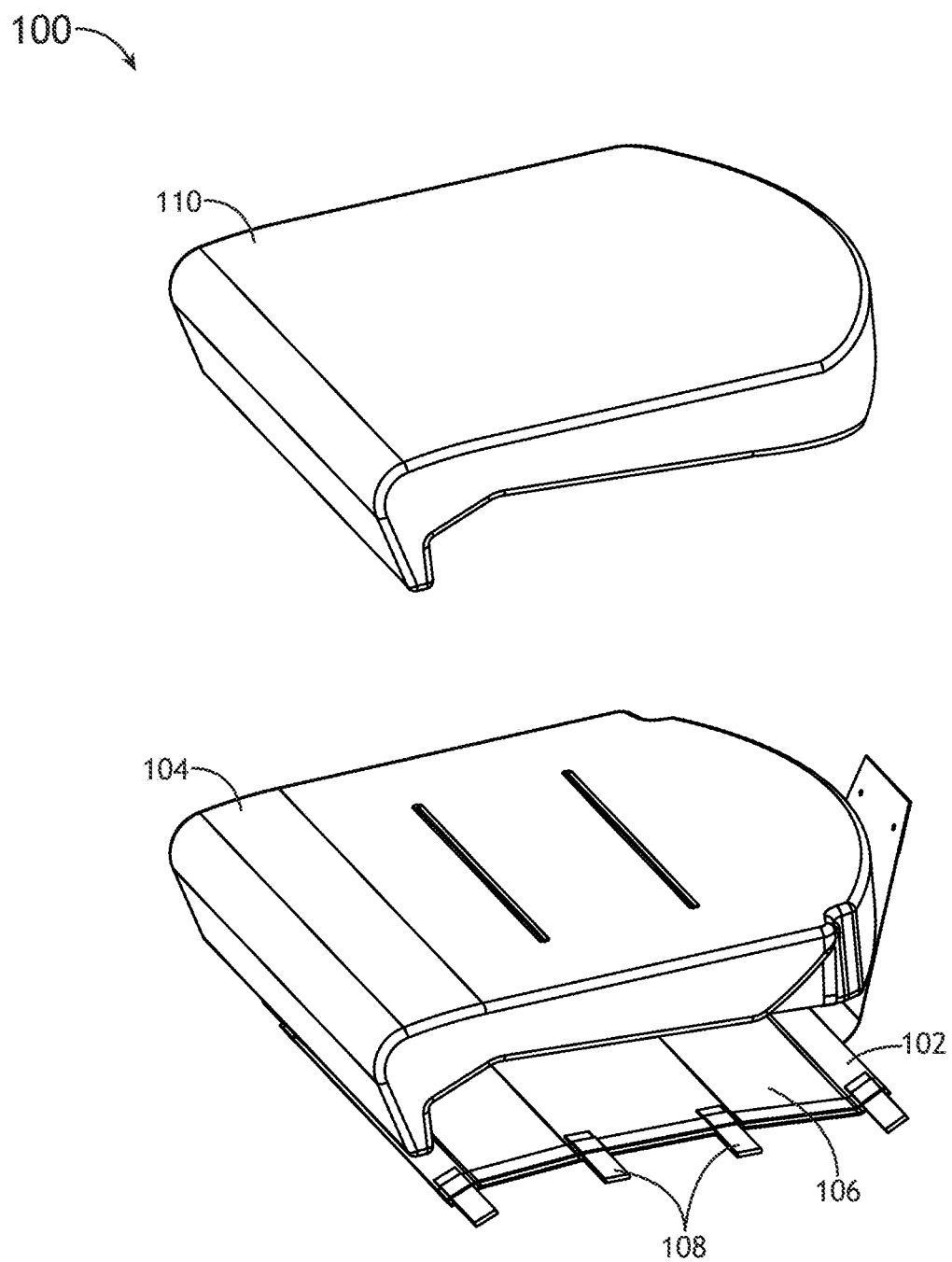
FIG. 1 illustrates an exploded perspective view of portions of an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Figure 2A:
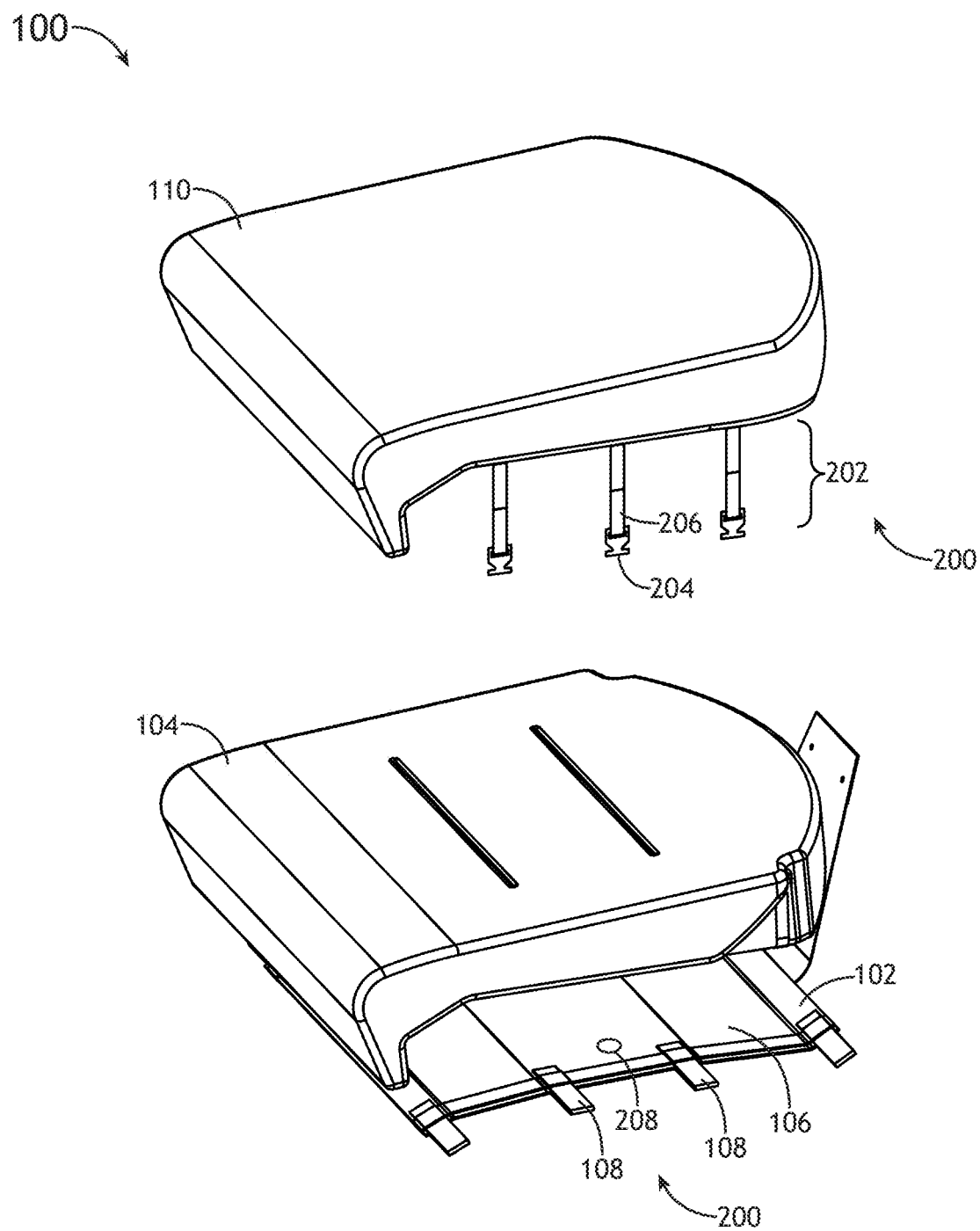
FIG. 2A illustrates an exploded perspective view of portions of an aircraft seat including an attachment assembly for a dress cover and a cushion, in accordance with one or more embodiments of the disclosure.
Figure 2B:
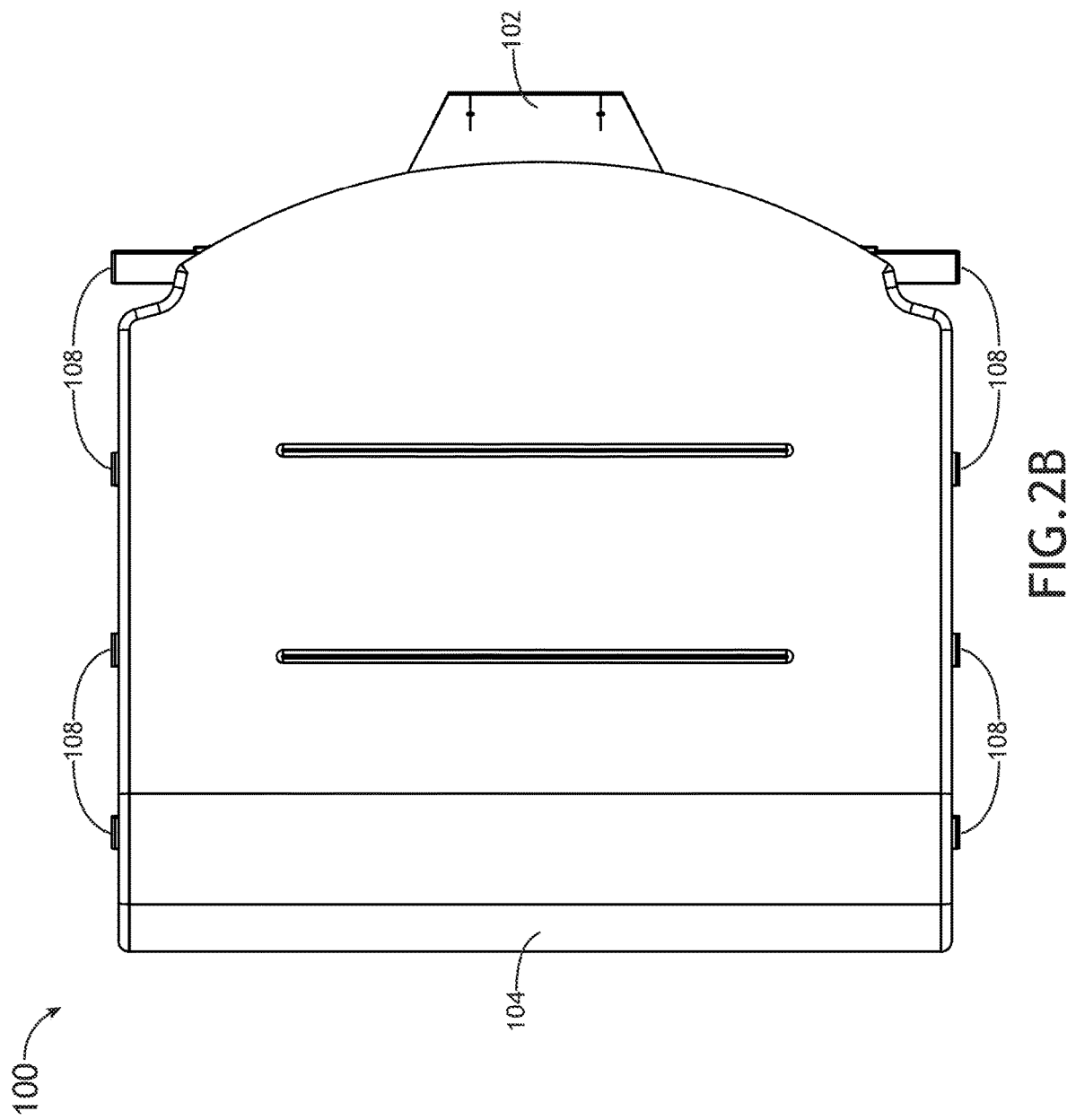
FIG. 2B illustrates a plan view of portions of an aircraft seat including an attachment assembly for a dress cover and a cushion, in accordance with one or more embodiments of the disclosure.
Figure 2C:
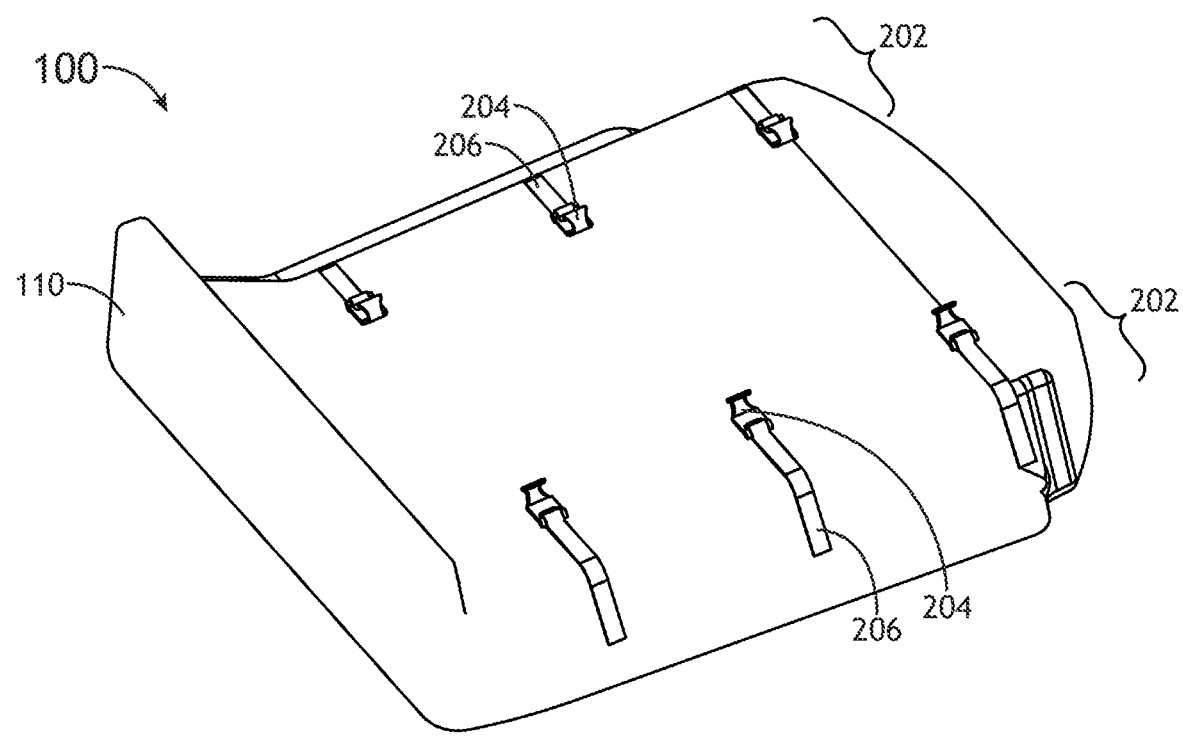
FIG. 2C illustrates a perspective view of portions of an aircraft seat including an attachment assembly for a dress cover and a cushion, in accordance with one or more embodiments of the disclosure.
Figure 2D:
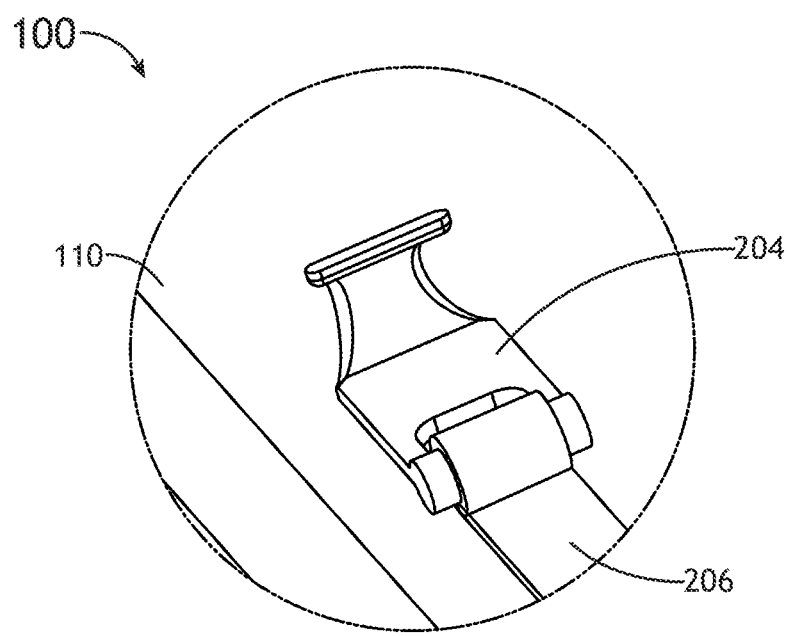
FIG. 2D illustrates a partial perspective view of portions of an aircraft seat including an attachment assembly for a dress cover and a cushion, in accordance with one or more embodiments of the disclosure.
Figure 2E:
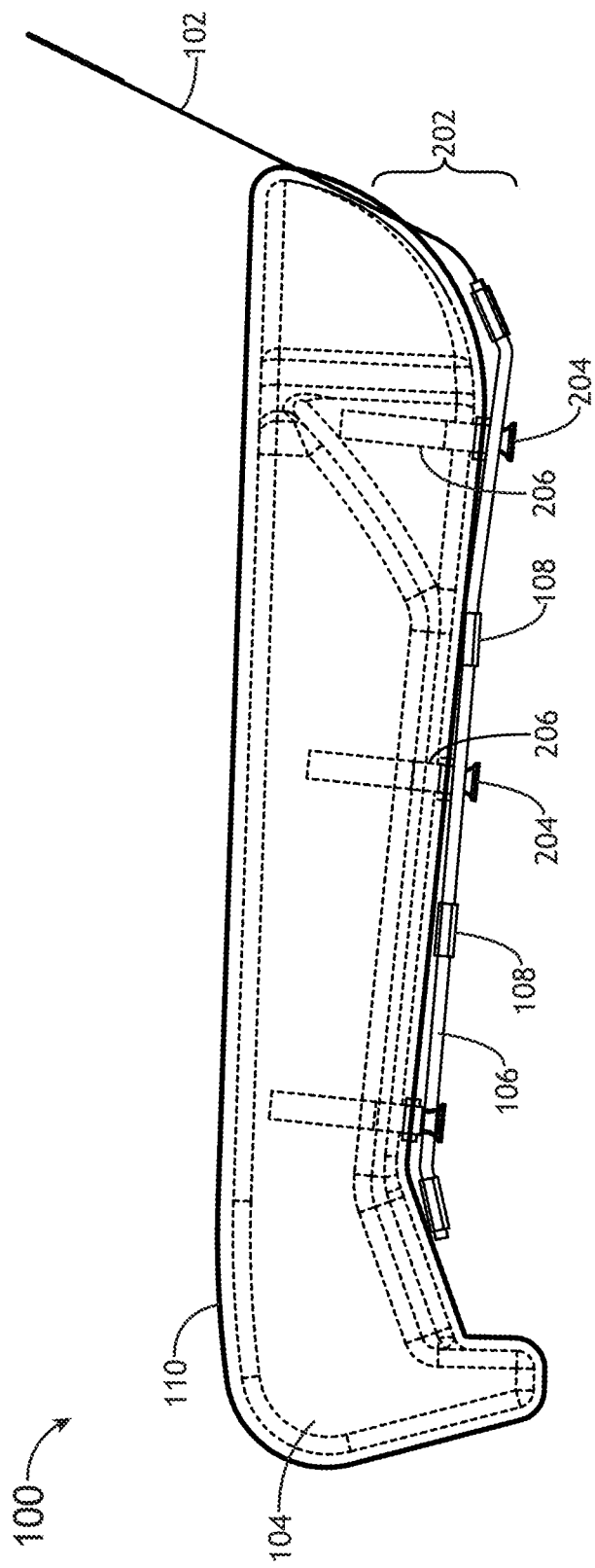
FIG. 2E illustrates an elevation cross-section view of portions of an aircraft seat including an attachment assembly for a dress cover and a cushion, in accordance with one or more embodiments of the disclosure.
Figure 2F:
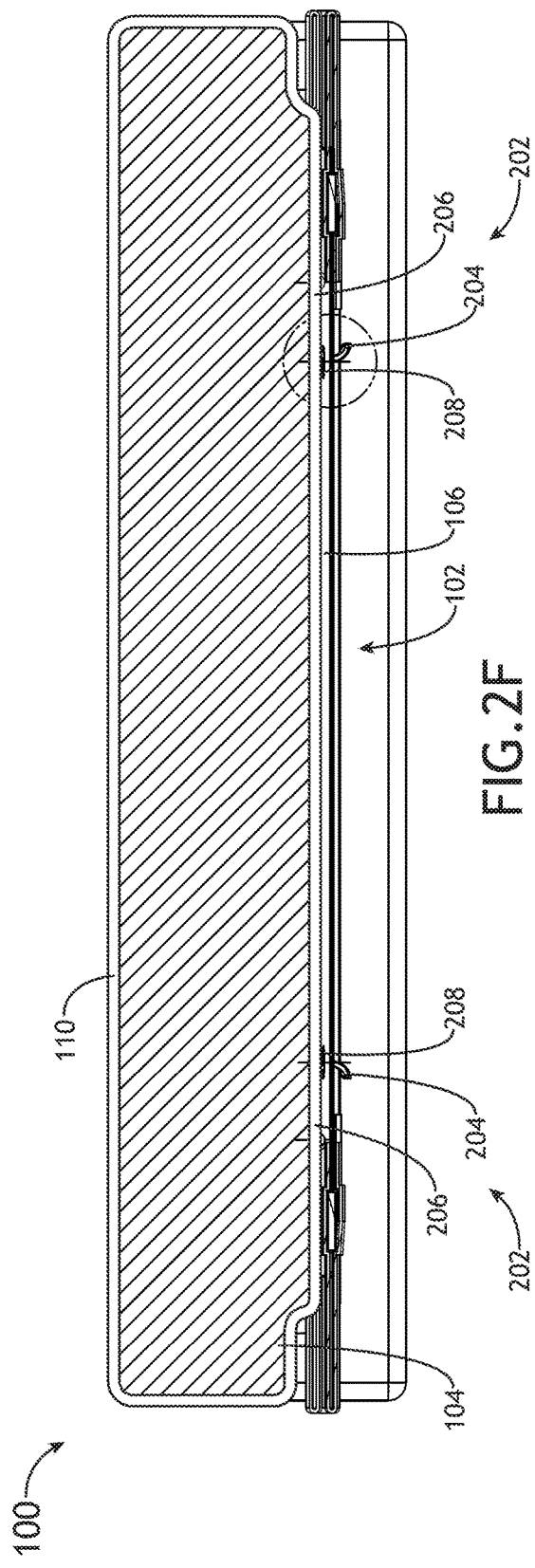
FIG. 2F illustrates an elevation cross-section view of portions of an aircraft seat including an attachment assembly for a dress cover and a cushion, in accordance with one or more embodiments of the disclosure.
Figure 2G:
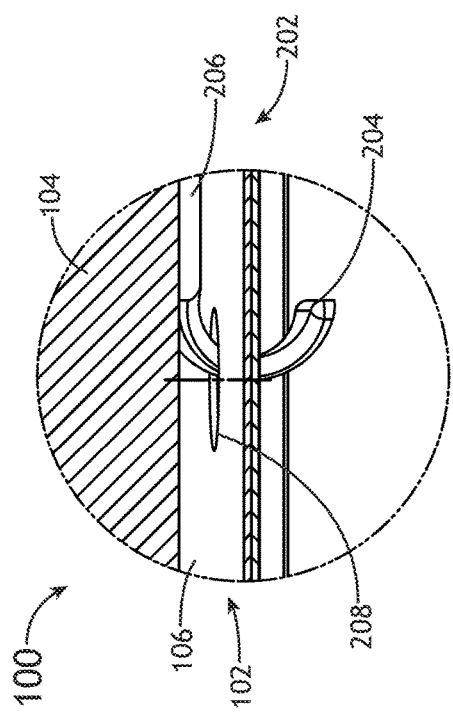
FIG. 2G illustrates a partial elevation cross-section view of portions of an aircraft seat including an attachment assembly for a dress cover and a cushion, in accordance with one or more embodiments of the disclosure.
Figure 3A:
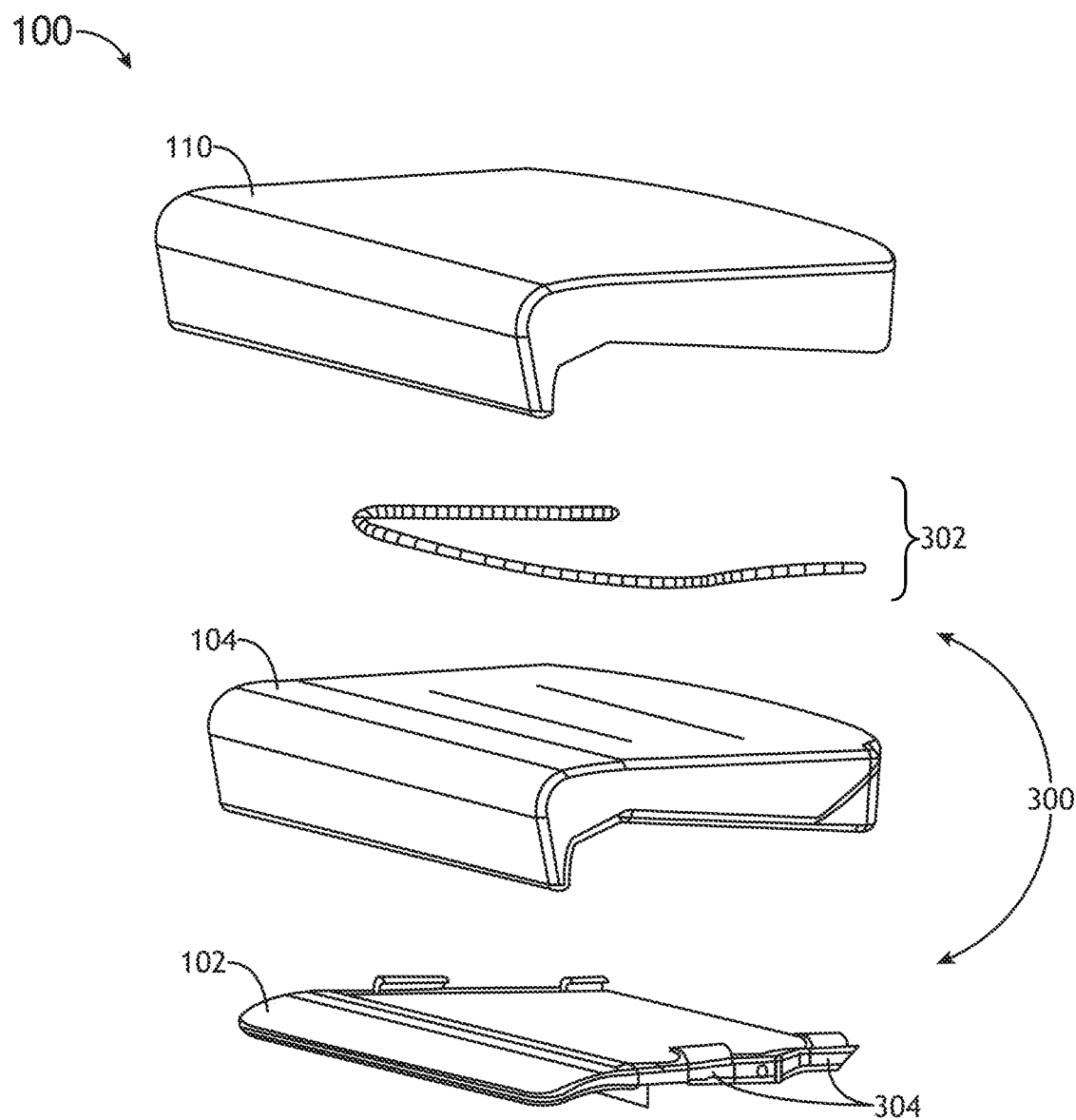
FIG. 3A illustrates an exploded perspective view of portions of an aircraft seat including an attachment assembly for a dress cover and a cushion, in accordance with one or more embodiments of the disclosure.
Figure 3B:
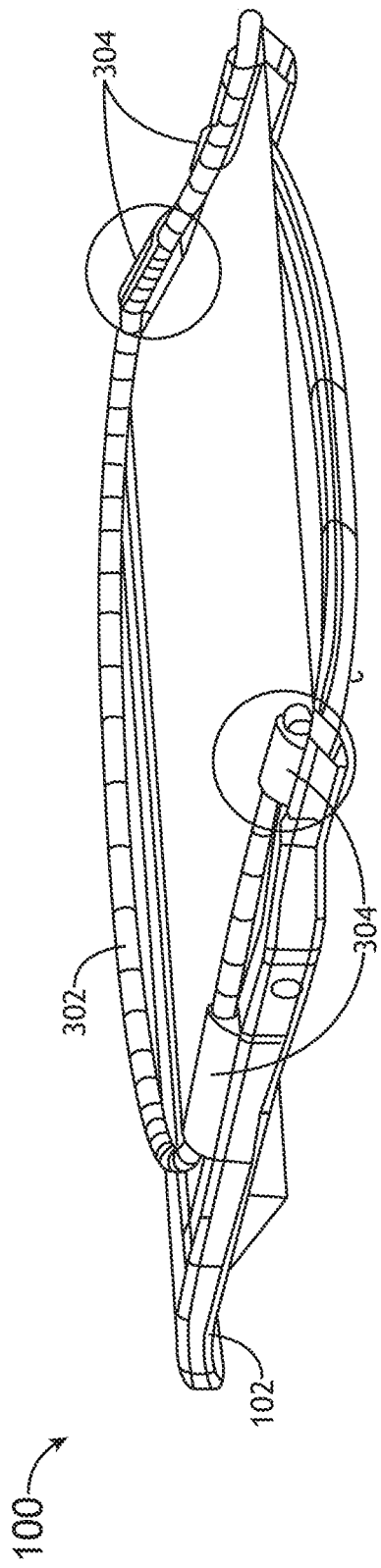
FIG. 3B illustrates a perspective view of portions of an aircraft seat including an attachment assembly for a dress cover and a cushion, in accordance with one or more embodiments of the disclosure.
Figure 3D:
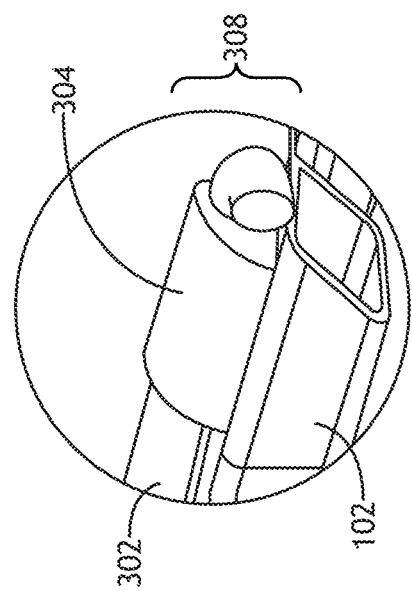
FIG. 3D illustrates a partial perspective view of portions of an aircraft seat including an attachment assembly for a dress cover and a cushion, in accordance with one or more embodiments of the disclosure.
Figure 3C:
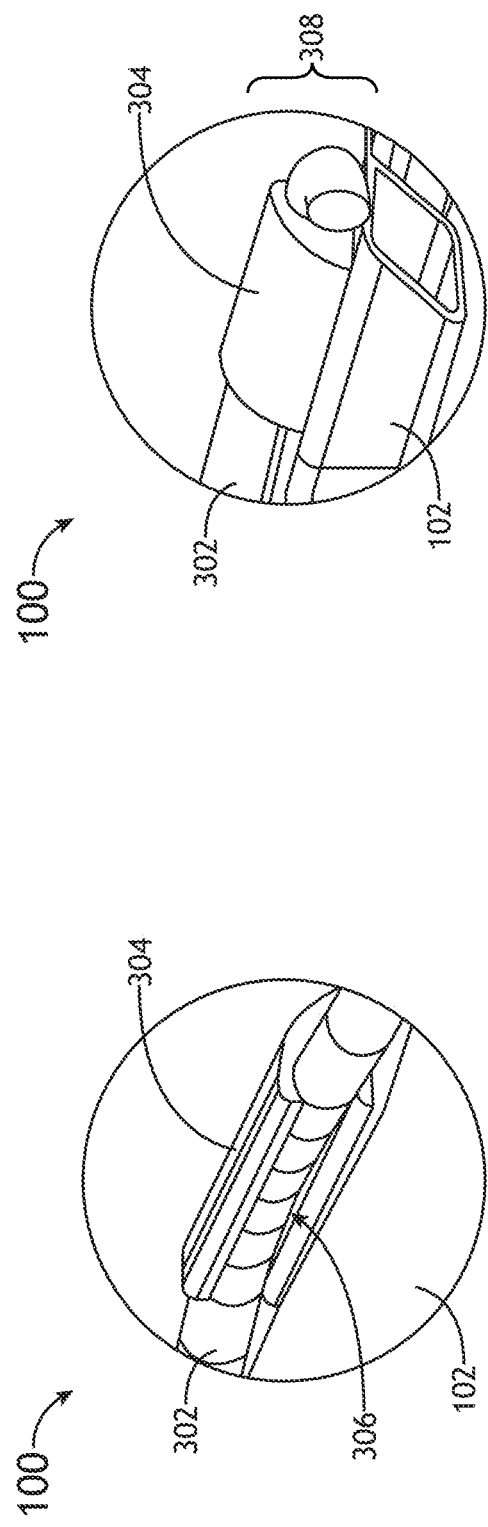
FIG. 3C illustrates a partial perspective view of portions of an aircraft seat including an attachment assembly for a dress cover and a cushion, in accordance with one or more embodiments of the disclosure.
Figure 3E:
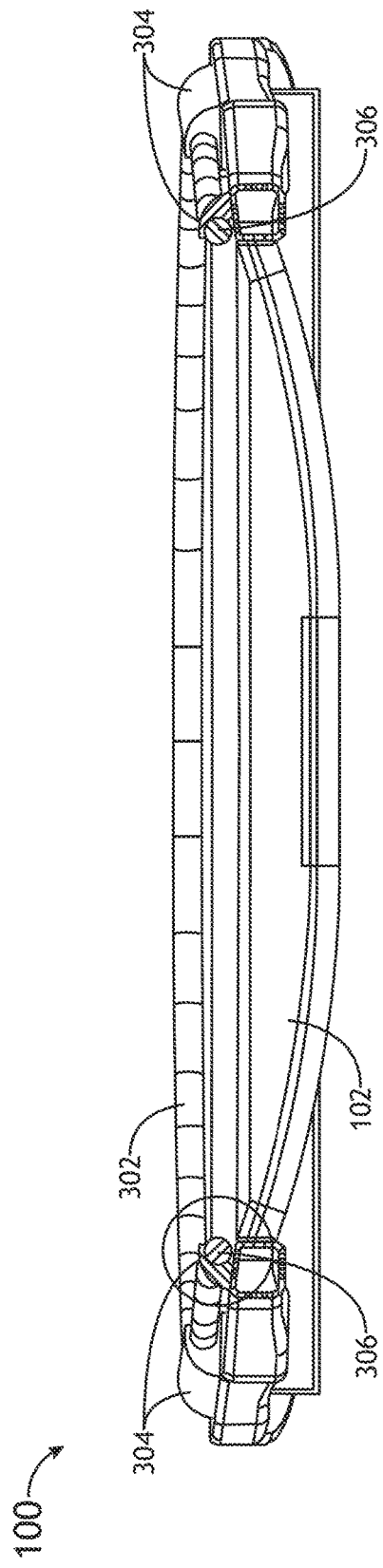
FIG. 3E illustrates an elevation cross-section view of portions of an aircraft seat including an attachment assembly for a dress cover and a cushion, in accordance with one or more embodiments of the disclosure.
Figure 3F:
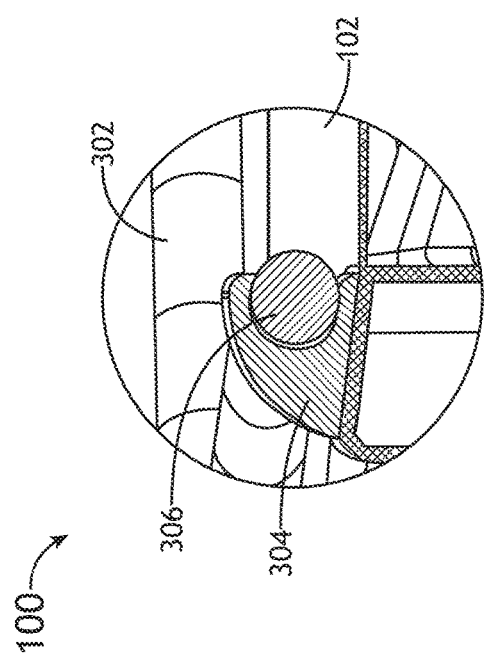
FIG. 3F illustrates a partial elevation cross-section view of portions of an aircraft seat including an attachment assembly for a dress cover and a cushion, in accordance with one or more embodiments of the disclosure.
Figure 3G:
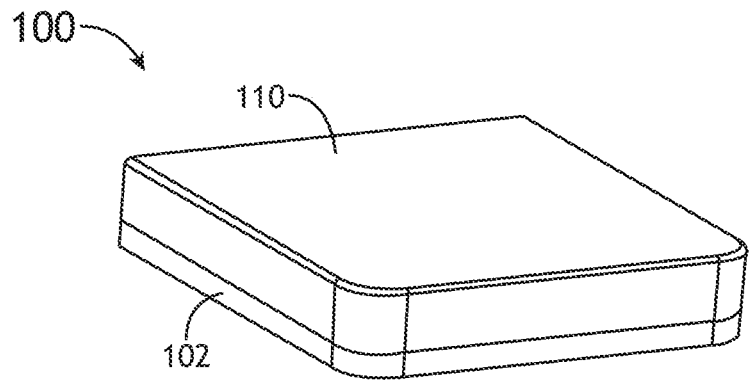
FIG. 3G illustrates a perspective view of portions of an aircraft seat including an attachment assembly for a dress cover and a cushion, in accordance with one or more embodiments of the disclosure.
Figure 3H:
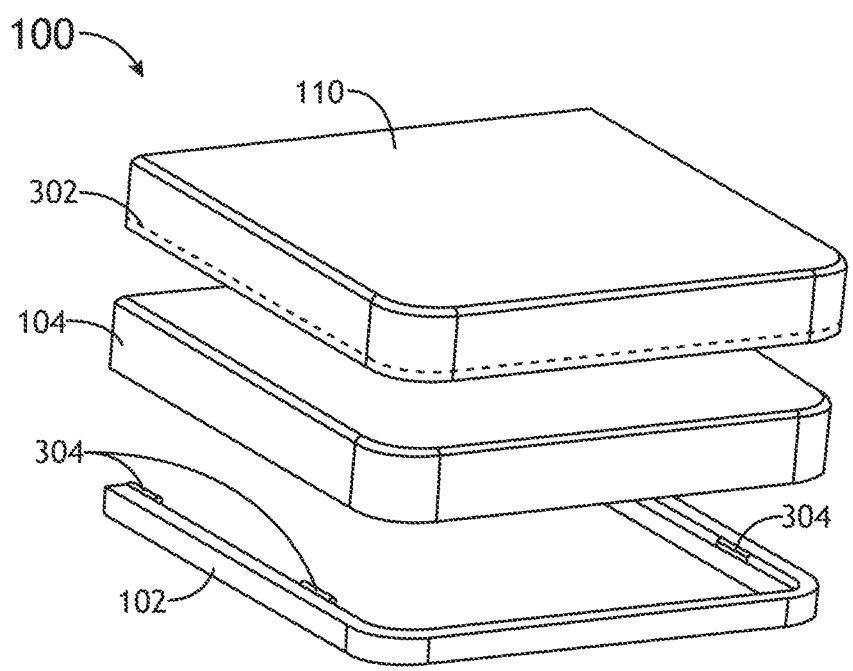
FIG. 3H illustrates an exploded perspective view of portions of an aircraft seat including an attachment assembly for a dress cover and a cushion, in accordance with one or more embodiments of the disclosure.
Figure 3I:
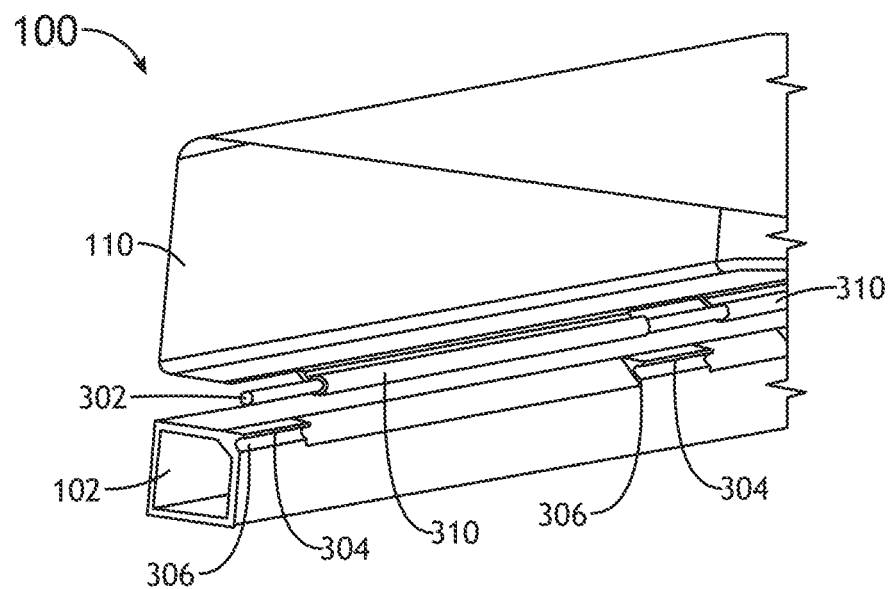
FIG. 3I illustrates a partial perspective view of portions of an aircraft seat including an attachment assembly for a dress cover and a cushion, in accordance with one or more embodiments of the disclosure.
Figure 3J:
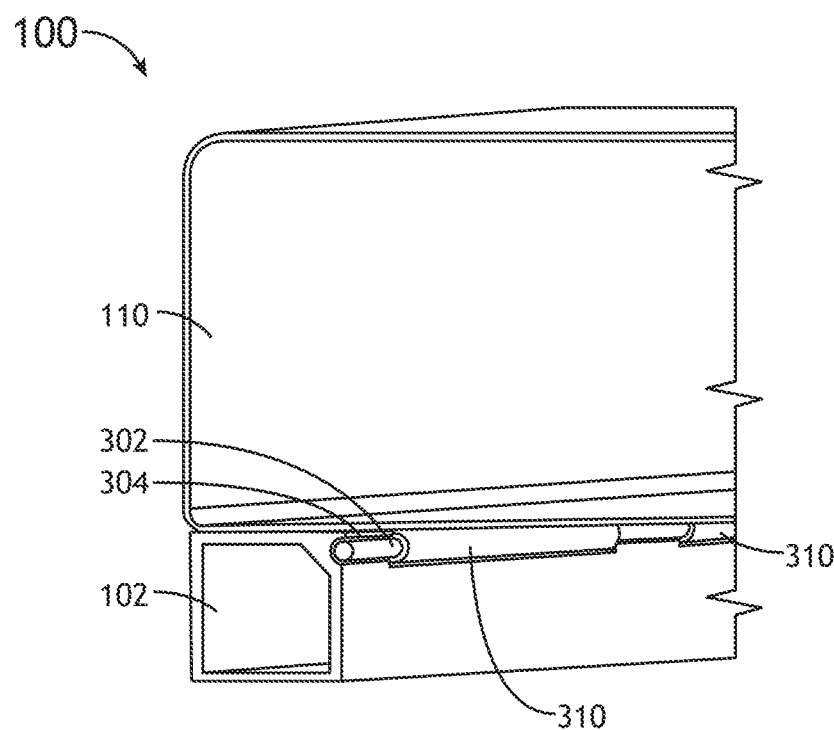
FIG. 3J illustrates a partial perspective view of portions of an aircraft seat including an attachment assembly for a dress cover and a cushion, in accordance with one or more embodiments of the disclosure.
Figure 4A:
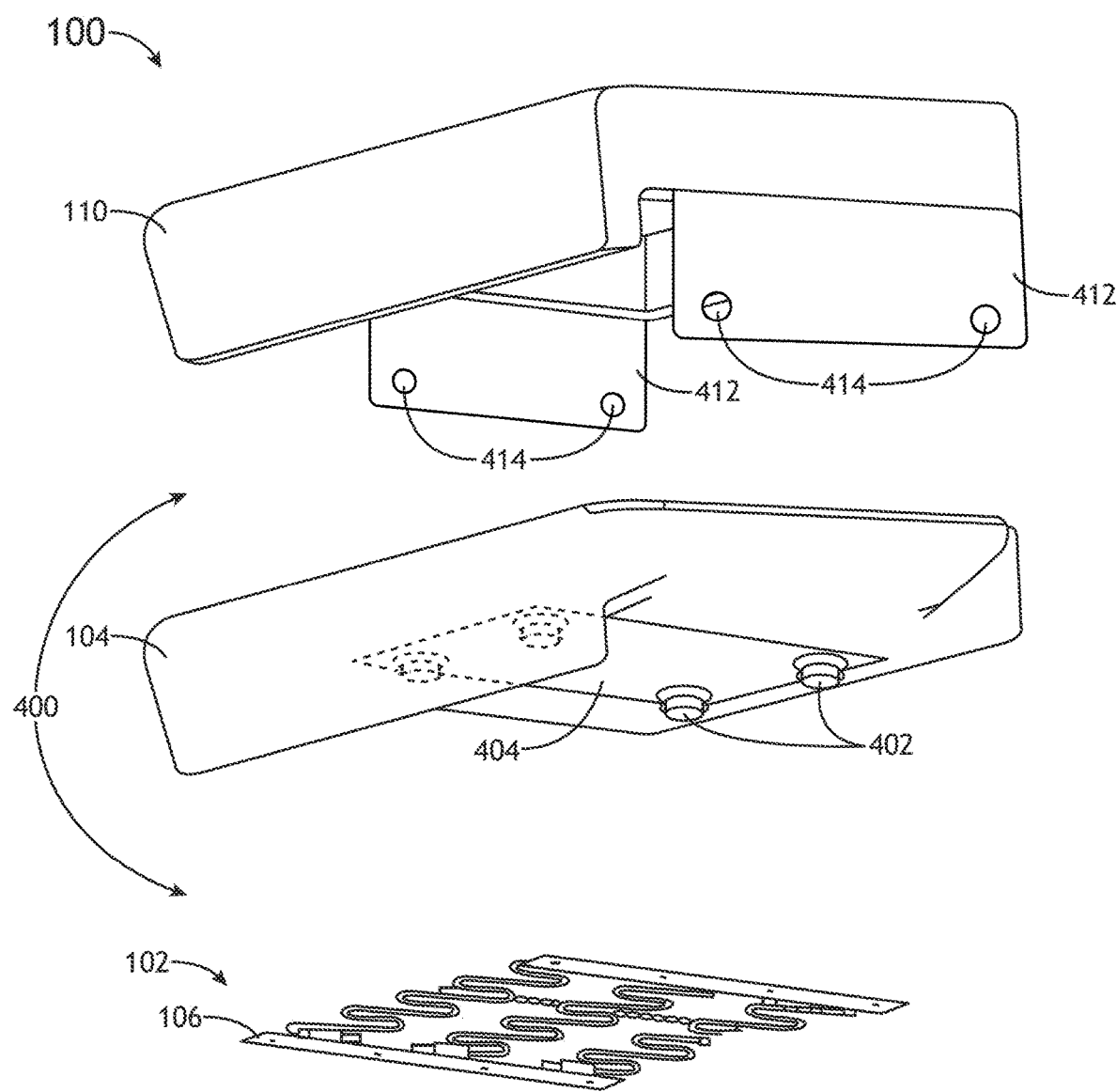
FIG. 4A illustrates an exploded perspective view of portions of an aircraft seat including an attachment assembly for a dress cover and a cushion, in accordance with one or more embodiments of the disclosure.
Figure 4B:
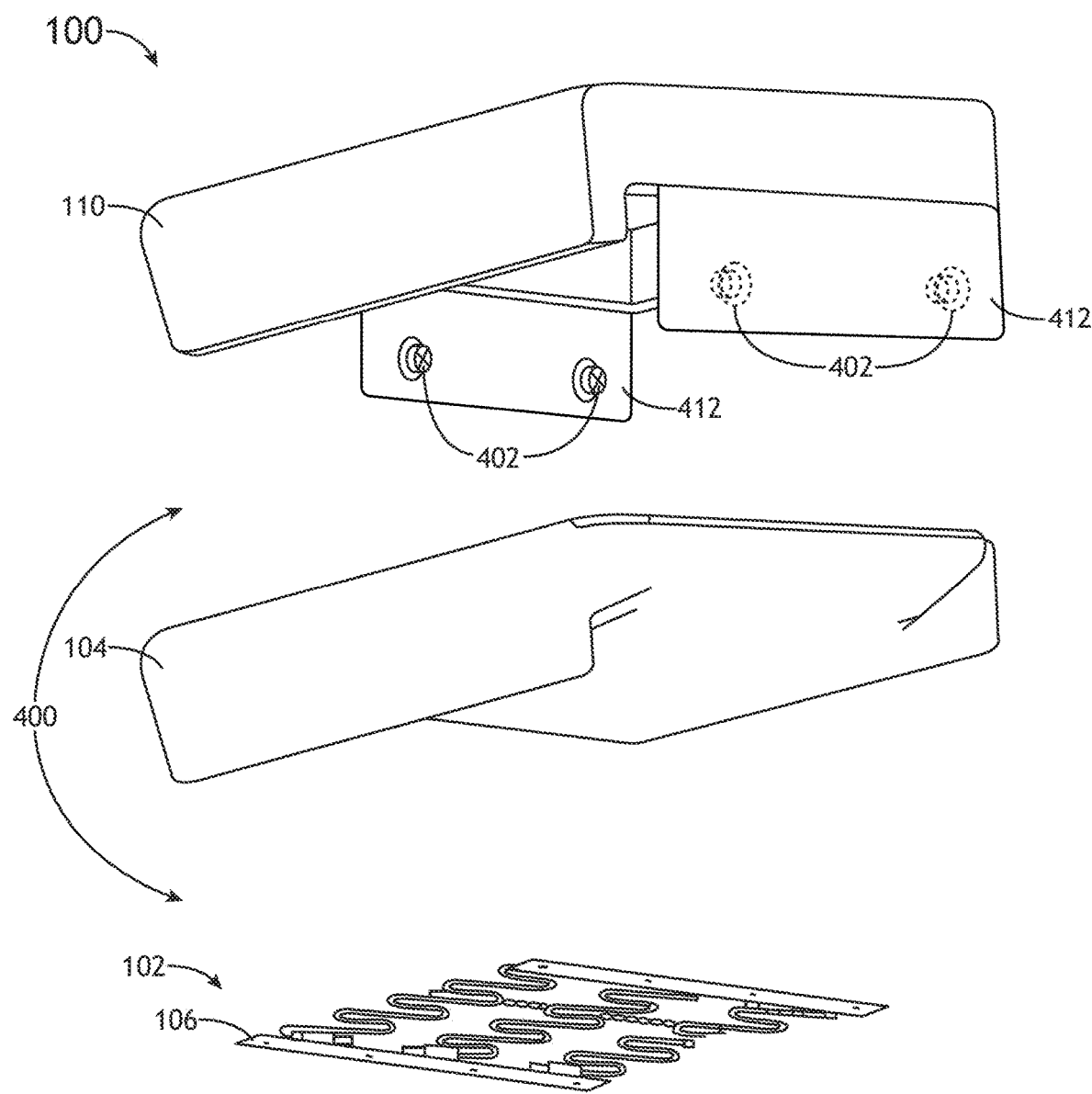
FIG. 4B illustrates an exploded perspective view of portions of an aircraft seat including an attachment assembly for a dress cover and a cushion, in accordance with one or more embodiments of the disclosure.
Figure 4C:
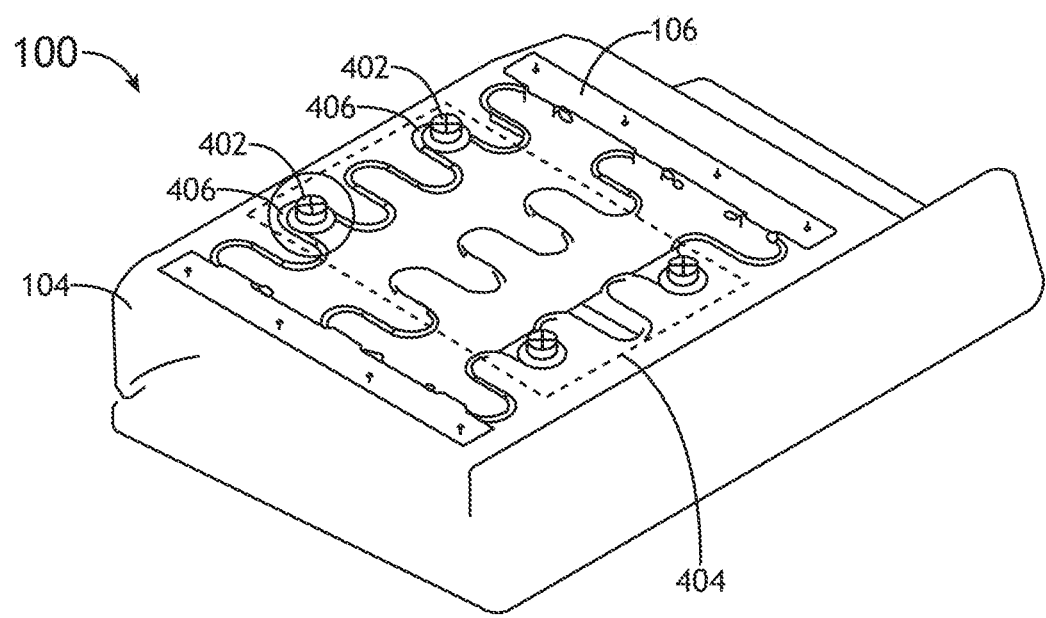
FIG. 4C illustrates a perspective view of portions of an aircraft seat including an attachment assembly for a dress cover and a cushion, in accordance with one or more embodiments of the disclosure.
Figure 4D:
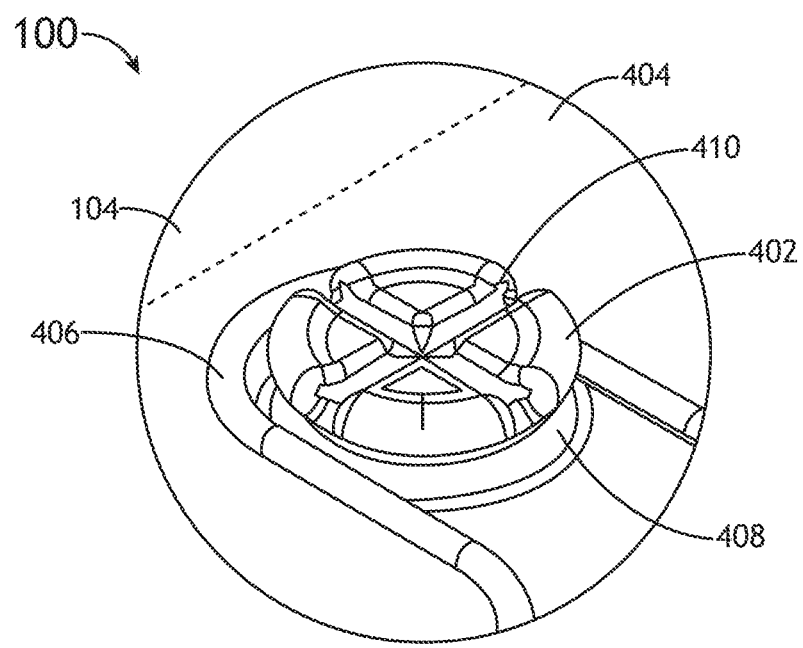
FIG. 4D illustrates a partial perspective view of portions of an aircraft seat including an attachment assembly for a dress cover and a cushion, in accordance with one or more embodiments of the disclosure.
Figure 4E:
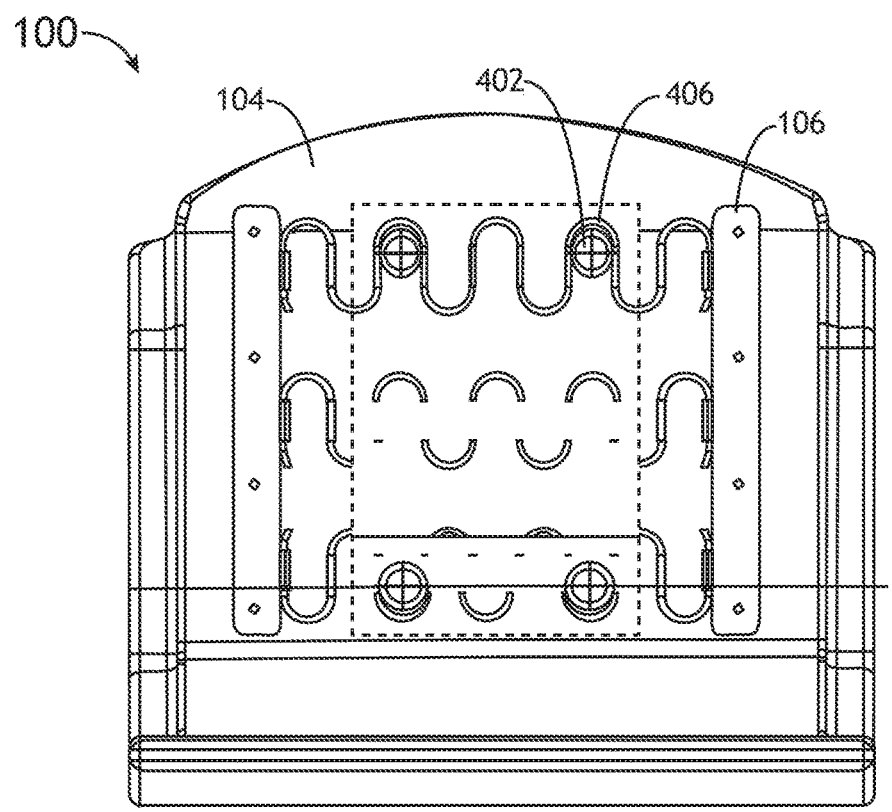
FIG. 4E illustrates a plan view of portions of an aircraft seat including an attachment assembly for a dress cover and a cushion, in accordance with one or more embodiments of the disclosure.
Figure 4F:
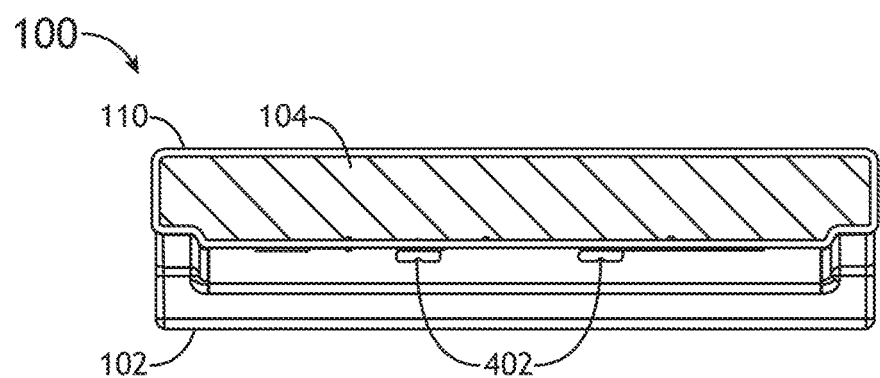
FIG. 4F illustrates an elevation cross-section view of portions of an aircraft seat including an attachment assembly for a dress cover and a cushion, in accordance with one or more embodiments of the disclosure.

FIGS. 1-4F generally illustrate an attachment assembly for a dress cover and a cushion of an aircraft seat, in accordance with one or more embodiments of the disclosure.

Seats may include components such as a support system, a cushion, and a dress cover. The components may be coupled together with one or more attachment assemblies. In select seat designs, hook and loop fastener assemblies (e.g., Velcro®) may be used to attach the dress cover to the cushion, the cushion to a support system, and/or the dress cover to the support system. Often, multiple hook and loop fastener assemblies are used, resulting in multiple attachment interfaces within the aircraft seat. For example, a first set of hook and loop fastener assemblies may be sewn into/onto the dress cover and the cushion, while a second set of hook and loop fastener assemblies may be located between the cushion and the support system. The multiple attachment interfaces may cause difficulties in alignment of the dress cover, cushion, and/or support system during manufacturing and/or installation of the aircraft seat. In addition, the multiple attachment interfaces may result in increased cost. Further, the multiple attachment interfaces may result in increased wear.

In addition, in select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. Hook and loop fasteners may present difficulties, including failing to meet load requirements (e.g., 9 g static load requirements or 16 g dynamic load requirements as set forth by the FAA), flammability requirements, or the like.

As such, it would be desirable to provide an attachment assembly for a dress cover and a cushion of an aircraft seat. The attachment assembly should reduce the usage of hook and loop fastener assemblies, allowing for more efficient review and searching of the seat for issues (e.g., for wear, for dirt or other mess such as airsickness, for contraband, or the like), and easier replacement of the seat components. The attachment assembly should reduce the number of attachment interfaces between the support system, the cushion and/or the dress cover. The attachment assembly should be configured in accordance with aviation guidelines and/or standards.

Referring in general to FIGS. 1-4F, one or more attachment assemblies may be integrated within an aircraft seat 100 installed within an aircraft cabin. For example, the aircraft seat 100 may include, but is not limited to, a business class or first-class passenger seat, an economy-class passenger seat, or the like. It is noted herein the terms "aircraft seats" and "passenger seats" may be considered equivalent, for purposes of the disclosure.

The aircraft seat 100 may be rotatable about an axis (e.g., swivelable). The aircraft seat 100 may be fully positionable between the outer limits of motion as defined by the moveable components of the aircraft seat 100. Where the aircraft seat 100 is installed within a passenger compartment, the aircraft seat 100 may be fully positionable between the outer limits of motion as defined by one or more passenger compartment monuments of the passenger compartment. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 100 may be actuatable (e.g., translatable and/or rotatable) from the TTOL position to a non-TTOL position, and/or vice versa. Further, it is noted herein the aircraft seat 100 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

In general, an aircraft seat 100 of the one or more aircraft seats 100 may be translatable (e.g., trackable or slidable). The aircraft seat 100 may be rotatable about an axis crosswise through the aircraft seat 100 into a position including, but not limited to, the upright or raised position, one or more lounge or reclined positions, and a lie-flat or bed position. For example, the aircraft seat 100 may transition directly between the upright or raised position and the lie-flat or bed position. By way of another example, it is noted herein the aircraft seat 100 may transition through one or more lounge or reclined positions between the upright or raised position and the lie-flat or bed position. By way of another example, the aircraft seat 100 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 100 may include a support system 102 and a cushion 104. For example, the support system 102 may include, but is not limited to, a seat pan, a seat back, or the like. The aircraft seat 100 may include a cushion 104. For example, the cushion 104 may include a seat pan cushion, a seat back cushion, or the like.

The support system 102 may include a diaphragm 106. For example, the diaphragm 106 may be a seat pan diaphragm, a seat back diaphragm, or the like. By way of another example, the diaphragm 106 may include a plastic diaphragm, a metal diaphragm, a fabric diaphragm, a wire or wireframe diaphragm, or the like. The support system 102 may be a rigid structure within the aircraft seat 100, such that the support system 102 does not move. The support system 102 may include one or more movable components such that the support system 102 may articulate. For example, the support system 102 may articulate when the aircraft seat 100 actuates between the upright or raised position, the one or more lounge or reclined positions, and/or the lie-flat or bed position.

The cushion 104 may conform or substantially conform to the support system 102. For example, at least one surface of the cushion 104 may conform to a corresponding surface of the support system 102. By way of another example, components of the support system 102 (e.g., components including, but not limited to, straps 108 configured to couple the diaphragm 106 to a set of posts of the aircraft seat 100, where the support system 102 is or includes the diaphragm 106) may extend beyond the boundaries of the cushion 104, such that the at least one surface of the cushion 104 does not fully conform to the corresponding surface of the support system 102. By way of another example, a portion of the cushion 104 may wrap around or otherwise enclose a portion of the support system 102 (e.g., including, but not limited to, a front edge or leading portion of the cushion 104). In general, the support system 102 may conform to a portion of a user (e.g., a passenger, a crew member, or the like), and the cushion 104 may similarly conform to the portion of the user due to the cushion 104 conforming to the support system 102.

The aircraft seat 100 may include a dress cover 110. The dress cover 110 may be configured to fit over at least a portion of the cushion 104. For example, the dress cover 110 may be configured to wrap around or otherwise enclose exterior surfaces of the cushion 104 not proximate to the support system 102. The dress cover 110 may be configured to attach to the support system 102 and/or the cushion 104.

FIGS. 2A-2G illustrate an example of one or more attachment assemblies 200 for attaching the dress cover 110 and the cushion 104 to the support system 102, in accordance with one or more embodiments of the disclosure.

A particular attachment assembly 200 may include one or more primary attachment features 202. A particular primary attachment feature 202 may include a hook 204. The hook 204 may be coupled to the dress cover 110 proximate to the perimeter or edge of the dress cover 110. For example, the hook 204 may be coupled to the dress cover 110 via a strap 206, such that the primary attachment feature 202 includes the hook 204 and the strap 206. For instance, the strap 206 may be sewn into the dress cover 110. In addition, the strap 206 may be a fixed length or may be adjustable (e.g., to center the dress cover 110 and the cushion 104 on the support system 102). By way of another example, the hook 204 may be directly coupled to the dress cover 110, such that the primary attachment feature 202 includes only the hook 204. For instance, the hook 204 may be sewn into the dress cover 110.

The attachment assembly 200 may include one or more auxiliary attachment features 208 on the support system 102, to which a corresponding primary attachment feature 202 may be configured to mate. For example, the auxiliary attachment feature 208 may include a hole within the support system 102 positioned proximate to the perimeter or edge of the support system 102 or within a predetermined distance from the perimeter or edge of the support system 102. For instance, the predetermined distance may be dependent on an amount of tension necessary to adequately secure the dress cover 110 to the support system 102 via the attachment assembly 200 (e.g., as defined by a tautness of the dress cover 110 over the cushion 104, an amount of movement (or inability of move) of the dress cover 106 and the cushion 104 relative to the support system 102, or other similar metric).

The one or more primary attachment features 202 may be components of a set. For example, the one or more primary attachment features 202 may be in a row within the set. For instance, each set may include, but are not limited to, three primary attachment features 202 in a row. In one non-limiting example where there are sets of primary attachment features 202, the sets of primary attachment features 202 may be coupled to the side portions of the dress cover 110 (e.g., proximate to a side edge of the dress cover 110) and the corresponding auxiliary attachment features 208 may be positioned along the side portions of the support system 102 (e.g., proximate to a side edge of the support system 102). It is noted herein the support system 102 may include sets of auxiliary attachment features 208 corresponding to the sets of primary attachment features 202. In general, however, the primary attachment features 202 and the corresponding auxiliary attachment features 208 may be located within any portion of the dress cover 110 and the support system 102, respectively. Therefore, the above description should not be interpreted as a limitation on the present disclosure but merely an illustration.

It is noted herein an area of the at least one surface of the cushion 104 conforming to the corresponding surface of the support system 102 may be slightly larger in area than the corresponding surface of the support system 102, such that the dress cover 110 may at least partially wrap underneath the cushion 104 prior to the one or more primary attachment features 202 mating with the one or more auxiliary attachment features 208.

It is noted herein where the one or more primary attachment features 202 and the one or more auxiliary attachment features 208 couple together may be considered an attachment interface of the aircraft seat 100, for purposes of the disclosure.

It is noted herein the combination of one or more of the mating mechanisms between the one or more primary attachment features 202 and the one or more auxiliary attachment features 208 and/or the at least partially wrapping of the cushion 104 by the dress cover 110 may result in a non-obvious method of attachment and detachment of the dress cover 110 (and the cushion 104) from the support system 102.

In this regard, the one or more primary attachment features 202 being mated to the corresponding auxiliary attachment features 208 may secure the cushion 104 and the dress cover 110 to the support system 102 without the use of hook and loop fastener assemblies. In addition, the mating of the primary attachment features 202 being mated to the corresponding auxiliary attachment features 208, during or following the wrapping of the cushion 104 with the dress cover 110, may cause the cushion 104 to be held in place on the support system 102 along with the dress cover 110, reducing the attachment assembly count to one attachment assembly 200 (and thus the attachment interface count to a single attachment interface). Further, existing support systems 102 and dress covers 110 may be modified with the one or more attachment assemblies 200 (e.g., primary attachment features 202 sewn onto the dress cover 110, and auxiliary attachment features 208 being added to the support system 102) without requiring a complete redesign and/or remanufacturing of the aircraft seat 100. Further, the one or more attachment assemblies 200 may allow for alignment of the cushion 104 and the dress cover 110, a more efficient review and search of the aircraft seat 100 for issues, and easier replacement of aircraft seat 100 components. It is noted herein that, where a portion of the cushion 104 wraps around or otherwise encloses a portion of the support system 102, the cushion 104 may assist in aligning the cushion 104 and the dress cover 110 with the support system 102 during installation in addition to the one or more attachment assemblies 200.

FIGS. 3A-3J illustrate an example of one or more attachment assemblies 300 for attaching the dress cover 110 and the cushion 104 to the support system 102, in accordance with one or more embodiments of the disclosure.

A particular attachment assembly 300 may include one or more primary attachment features 302. For example, the one or more primary attachment features 302 may include one or more wire springs 302. The one or more wire springs 302 may conform to at least a portion of the support system 102. For example, the attachment assembly 300 may include a single wire spring 302 configured to conform to at least a portion of the perimeter or edge of the support system 102. It is noted herein, however, the one or more wire springs 302 may be independently-shaped from the at least the portion of the support system 102.

The attachment assembly 300 may include one or more auxiliary attachment features 304 on the support system 102, to which a corresponding primary attachment features (e.g., a corresponding wire spring 302) may be configured to mate. For example, an auxiliary attachment feature 304 may include a tab 304 coupled to and/or at least partially integrated with the support system 102 proximate to the perimeter or edge of the support system 102 or within a predetermined distance from the perimeter or edge of the support system 102. For instance, the predetermined distance may be dependent on an amount of tension necessary to adequately secure the dress cover 110 to the support system 102 via the attachment assembly 300 (e.g., as defined by a tautness of the dress cover 110 over the cushion 104, an amount of movement (or inability of move) of the dress cover 106 and the cushion 104 relative to the support system 102, or other similar metric).

The tab 304 may include a groove 306 configured to receive a wire spring 302. Where the attachment assembly 300 includes multiple tabs 304, at least some tabs 304 of the multiple tabs 304 may face inward toward a center of the support system 102 (e.g., as illustrated in at least FIG. 3C) and at least some tabs 304 of the multiple tabs 304 may face outward away from the center of the support system 102 (e.g., as illustrated in at least FIG. 3D).

When installed in the one or more tabs 304, the one or more wire springs 302 may be compressed and provide an outward-acting spring force on the one or more tabs 304, securing the one or more wire springs 302 in place. In addition, the one or more wire springs 302 may include one or more crimped or curved ends 308 configured to prevent the one or more wire springs 302 from disengaging from the one or more tabs 304 and further secure the one or more wire springs 302 in place.

The one or more wire springs 302 may be coupled to the dress cover 110. For example, the one or more wire springs 302 may be inserted into one or more sleeves or runways 310 sewn to the dress cover 110 proximate to the perimeter or edge of the dress cover 110. By way of another example, the one or more wire springs 302 may be interwoven into the dress cover 110 proximate to the edge of the dress cover 110.

The dress cover 110 may wrap around or otherwise enclose the cushion 104 and keep the cushion 104 contained, such that the cushion 104 may provide an additional spring force against the dress cover 110 to help the dress cover 110 and cushion 104 stay in place when installed on the support system 102. It is noted herein an area of the at least one surface of the cushion 104 conforming to the corresponding surface of the support system 102 may be slightly larger in area than the corresponding surface of the support system 102, such that the dress cover 110 may at least partially wrap underneath the cushion 104 prior to the one or more primary attachment features 302 mating with the one or more auxiliary attachment features 304.

It is noted herein where the one or more primary attachment features 302 and the one or more auxiliary attachment features 304 couple together may be considered an attachment interface of the aircraft seat 100, for purposes of the disclosure.

It is noted herein the combination of one or more of the mating mechanisms between the one or more primary attachment features 302 (e.g., such as the one or more wire springs 302) and the one or more auxiliary attachment features 304, the crimped or curved ends of the one or more wire springs 302, and/or the at least partially wrapping of the cushion 104 by the dress cover 110 may result in a non-obvious method of attachment and detachment of the dress cover 110 (and the cushion 104) from the support system 102.

In this regard, the one or more primary attachment features 302 being mated to the one or more auxiliary attachment features 304 may secure the cushion 104 and the dress cover 110 to the support system 102 without the use of hook and loop fastener assemblies. In addition, the one or more primary attachment features 302 being mated to the one or more auxiliary attachment features 304, during or following the wrapping of the cushion 104 with the dress cover 110, may cause the cushion 104 to be held in place on the support system 102 along with the dress cover 110, reducing the attachment assembly count to one attachment assembly 300 (and thus the attachment interface count to a single attachment interface). Further, existing support systems 102 and dress covers 110 may be modified with the one or more attachment assemblies 300 (e.g., wire springs 302 sewn onto the dress cover 110, and auxiliary attachment features 304 being added to the support system 102) without requiring a complete redesign and/or remanufacturing of the aircraft seat 100. Further, the one or more attachment assemblies 300 may allow for alignment of the cushion 104 and the dress cover 110, a more efficient review and search of the aircraft seat 100 for issues, and easier replacement of aircraft seat 100 components. It is noted herein that, where a portion of the cushion 104 wraps around or otherwise encloses a portion of the support system 102, the cushion 104 may assist in aligning the cushion 104 and the dress cover 110 with the support system 102 during installation in addition to the one or more attachment assemblies 300.

FIGS. 4A-4F illustrate an example of one or more attachment assemblies 400 for attaching the dress cover 110 and the cushion 104 to the support system 102, in accordance with one or more embodiments of the disclosure.

A particular attachment assembly 400 may include one or more primary attachment features 402. For example, the one or more primary attachment features 400 may include one or more hooks 402. The attachment assembly 400 may include one or more plates 404. The one or more hooks 402 may be coupled to or at least partially embedded within the one or more plates 404. It is noted herein, however, the one or more hooks 402 may be protrusions formed within the one or more plates 404, such that the one or more hooks 402 are integrated within the one or more plates 404.

The one or more plates 404 may be coupled to or integrated with an interior plate within the cushion 104 (e.g., prior to attachment of a fire block of the cushion 104). The one or more plates 404 may be coupled to or integrated with an exterior surface of the cushion 104. For example, the one or more plates 404 may be sewn into a thermoplastic surface of the cushion 104. By way of another example, the one or more plates 404 may be affixed to the cushion 104 with an adhesive, fasteners, or the like. The one or more plates 404 may be set within the cushion 104 such that the cushion 104 is overmolded onto the one or more plates 404.

The one or more hooks 402 may mate to the diaphragm 106 of the support system 102. For example, the diaphragm 106 may be a wireframe or metal spring diaphragm with one or more wire supports 406. For instance, the one or more hooks 402 may be configured to mate with the one or more wire supports 406, with a particular hook 402 fitting within an inside curve of a particular wire support 406. In addition, the one or more hooks 402 may include one or more grooves 408 configured to engage the one or more wire supports 406. Further, the one or more hooks 402 may include one or more grooves 410, which may allow the one or more hooks 402 elastically deform for ease of removal from the support system 102.

The attachment assembly 400 may include one or more extensions 412 on the dress cover 110. For example, an extension 412 may include a flap of fabric sewn to or forming a portion of the dress cover 110. A flap 412 may include one or more holes 414 that correspond to the one or more hooks 402. For example, the dress cover 110 may wrap around the cushion 104, allowing the one or more holes 414 to engage the one or more hooks 402 prior to the one or more hooks 402 engaging the support system 102. It noted herein the one or more hooks 402 may be coupled to or at least partially embedded within the one or more extensions 412 instead of the plate 404, such that the plate 404 may not be necessary.

It is noted herein that at least one the one or more wire supports 406 of the support system 102 and/or the one or more extensions 412 may be considered auxiliary attachment features of the attachment assembly 400 positioned proximate to the perimeter or edge of the support system 102 or within a predetermined distance from the perimeter or edge of the support system 102, for purposes of the disclosure. For example, the predetermined distance may be dependent on an amount of tension necessary to adequately secure the dress cover 110 to the support system 102 via the attachment assembly 400 (e.g., as defined by a tautness of the dress cover 110 over the cushion 104, an amount of movement (or inability of move) of the dress cover 106 and the cushion 104 relative to the support system 102, or other similar metric).

It is noted herein where the one or more primary attachment features 402 and the one or more auxiliary attachment features (e.g., the one or more wire supports 406 of the support system 102 and/or the one or more extensions 412) couple together may be considered an attachment interface of the aircraft seat 100, for purposes of the disclosure.

It is noted herein the combination of one or more of the mating mechanisms between the one or more primary attachment features 402 and the one or more auxiliary attachment features (e.g., the one or more wire supports 406 of the support system 102 and/or the one or more extensions 412) and/or the at least partially wrapping of the cushion 104 by the dress cover 110 may result in a non-obvious method of attachment and detachment of the dress cover 110 (and the cushion 104) from the support system 102.

In this regard, the one or more primary attachment features 402 being mated to the one or more auxiliary attachment features (e.g., the one or more wire supports 406 of the support system 102 and/or the one or more extensions 412) may secure the cushion 104 and the dress cover 110 to the support system 102 without the use of hook and loop fastener assemblies. In addition, the one or more primary attachment features 402 being mated to the one or more auxiliary attachment features (e.g., the one or more wire supports 406 of the support system 102 and/or the one or more extensions 412), during or following the wrapping of the cushion 104 with the dress cover 110, may cause the cushion 104 to be held in place on the support system 102 along with the dress cover 110, reducing the attachment assembly count to one attachment assembly 400 (and thus the attachment interface count to a single attachment interface). Further, existing support systems 102 and dress covers 110 may be modified with the one or more attachment assemblies 400 (e.g., auxiliary attachment features such as extensions 412 sewn onto the dress cover 110, and primary attachment features 402 being added to the cushion 104 or the extensions 412) without requiring a complete redesign and/or remanufacturing of the aircraft seat 100. Further, the one or more attachment assemblies 400 may allow for alignment of the cushion 104 and the dress cover 110, a more efficient review and search of the aircraft seat 100 for issues, and easier replacement of aircraft seat 100 components. It is noted herein that, where a portion of the cushion 104 wraps around or otherwise encloses a portion of the support system 102, the cushion 104 may assist in aligning the cushion 104 and the dress cover 110 with the support system 102 during installation in addition to the one or more attachment assemblies 400.

It is noted herein any embodiment directed to the attachment assembly 200 and/or the one or more components of the attachment assembly 200 may be directed to the attachment assemblies 300, 400 and/or the one or more components of the attachment assemblies 300, 400 respectively. In addition, it is noted herein that any embodiment directed to the attachment assembly 300 and/or the one or more components of the attachment assembly 300 may be directed to the attachment assemblies 200, 400 and/or the one or more components of the attachment assemblies 200, 400 respectively. Further, it is noted herein that any embodiment directed to the attachment assembly 400 and/or the one or more components of the attachment assembly 400 may be directed to the attachment assemblies 200, 300 and/or the one or more components of the attachment assemblies 200, 300 respectively. Therefore, the above description should not be interpreted as a limitation on the present disclosure but merely an illustration.

It is noted herein the attachment assemblies 200, 300, 400 may be configured to work with any aircraft seat 100 and/or any set of components in the aircraft seat 100. For example, the attachment assemblies 200, 300, 400 may be configured to take into account any changes in shape (e.g., within the x-y plane) of the components of the aircraft seat 100, where the changes in shape may be caused by or otherwise dependent on the location of the aircraft seat 100 within the aircraft cabin.

Although embodiments of the disclosure illustrate the attachment assemblies 200, 300, 400 being integrated within the aircraft seat 100, it is noted herein, however, that the attachment assemblies 200, 300, 400 and/or components of the attachment assemblies 200, 300, 400 are not limited to the aviation environment and/or the aircraft components within the aviation environment. For example, the attachment assemblies 200, 300, 400 and/or components of the attachment assemblies 200, 300, 400 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the attachment assemblies 200, 300, 400 and/or components of the attachment assemblies 200, 300, 400 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, comprising:
   a support system including a diaphragm;
   a cushion including at least one surface configured to conform to a corresponding surface of the support system;
   a dress cover, the dress cover configured to fit over at least a portion of the cushion; and
   an attachment assembly, comprising:
      a primary attachment feature coupled to the dress cover proximate to at least one edge of the dress cover; and
      an auxiliary attachment feature integrated within the support system,
   the attachment assembly configured to secure the at least one surface of the cushion against the corresponding surface of the support system when the primary attachment feature is coupled to the auxiliary attachment feature at a single attachment interface for the support system, the cushion, and the dress cover,
   the primary attachment feature including a wire spring, the auxiliary attachment feature including a plurality of tabs, each tab of the plurality of tabs including a groove configured to receive the wire spring, at least one tab of the plurality of tabs facing inward toward a center of the support system, at least one tab of the plurality of tabs facing outward away from the center of the support system.

2. The aircraft seat of claim 1, the wire spring being coupled to the dress cover proximate to at least two edges of the dress cover, the plurality of tabs being integrated with the support system proximate to at least two edges of the support system.

3. The aircraft seat of claim 1, the dress cover including a sleeve coupled to the dress cover proximate to the at least two edges of the dress cover, the wire spring being inserted into the sleeve.

4. The aircraft seat of claim 1, the wire spring including at least one curved end, the at least one curved end configured to prevent the wire spring from disengaging from a tab of the plurality of tabs.

5. The aircraft seat of claim 1, the primary attachment feature including a plurality of hooks, the auxiliary attachment feature including a plurality of wire supports of the diaphragm, at least some wire supports of the plurality of wire supports including an inside curve configured to receive a hook of the plurality of hooks.

6. The aircraft seat of claim 5, the dress cover including one or more extensions coupled to the dress cover, each extension of the one or more extensions being proximate to a side edge of the dress cover, the plurality of hooks being coupled to the one or more extensions.

7. An aircraft seat, comprising:
   a support system including a diaphragm;
   a cushion including at least one surface configured to conform to a corresponding surface of the support system;
   a dress cover, the dress cover configured to fit over at least a portion of the cushion; and
   an attachment assembly, comprising:
      a primary attachment feature coupled to the cushion; and
      an auxiliary attachment feature integrated within the support system,
   the attachment assembly configured to secure the at least one surface of the cushion against the corresponding surface of the support system when the primary attachment feature is coupled to the auxiliary attachment feature at a single attachment interface for the support system, the cushion, and the dress cover,
   the primary attachment feature including a plurality of hooks coupled to a plate, the plurality of hooks being coupled to the cushion via the plate, the auxiliary attachment feature including a plurality of wire supports of the diaphragm, at least some wire supports of the plurality of wire supports including an inside curve configured to receive a hook of the plurality of hooks.

8. The aircraft seat of claim 7, the dress cover including one or more extensions coupled to the dress cover, each extension of the one or more extensions being proximate to a side edge of the dress cover, the one or more extensions including a plurality of holes corresponding to the plurality of hooks.

9. The aircraft seat of claim 8, the plurality of holes being coupled to the plurality of hooks prior to the plurality of hooks engaging the plurality of wire supports.

* * * * *